UNITED STATES PATENT OFFICE.

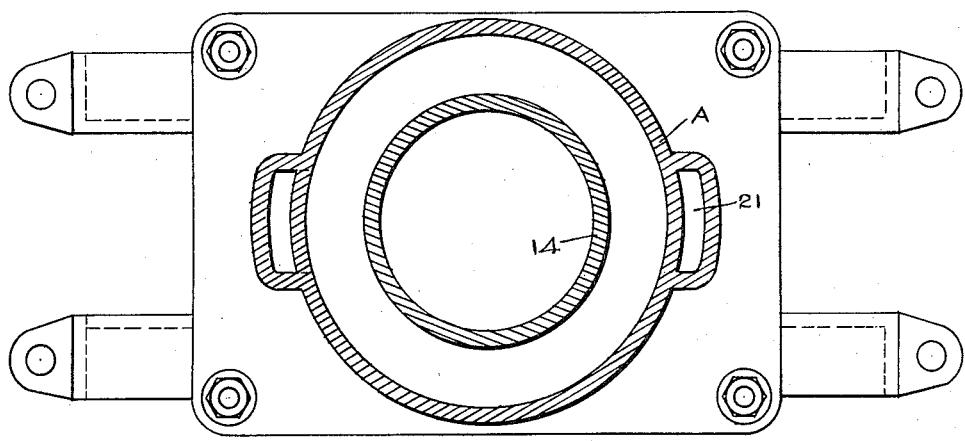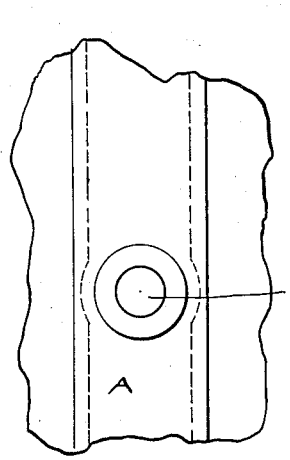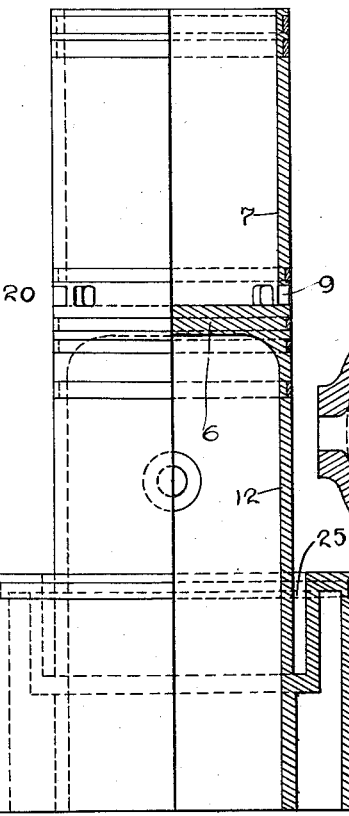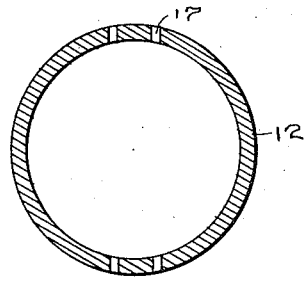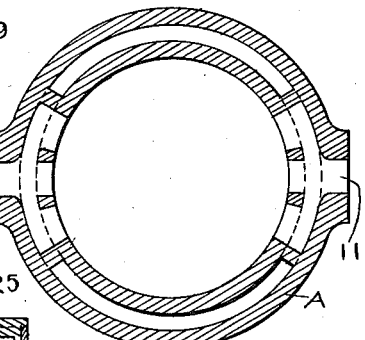

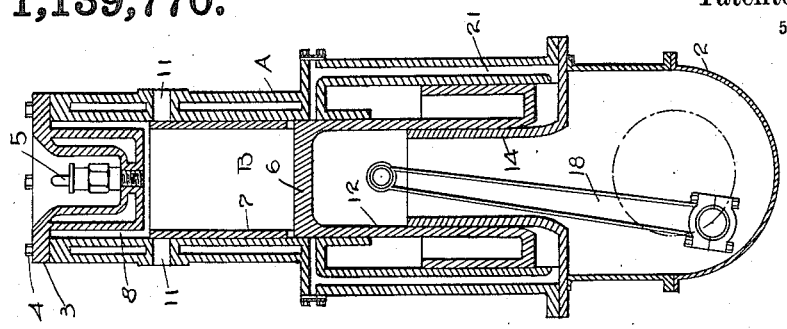
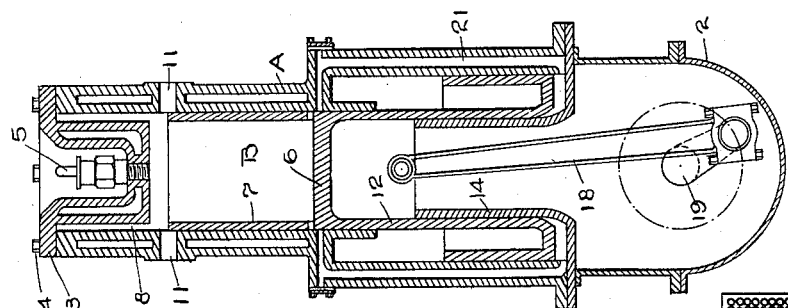
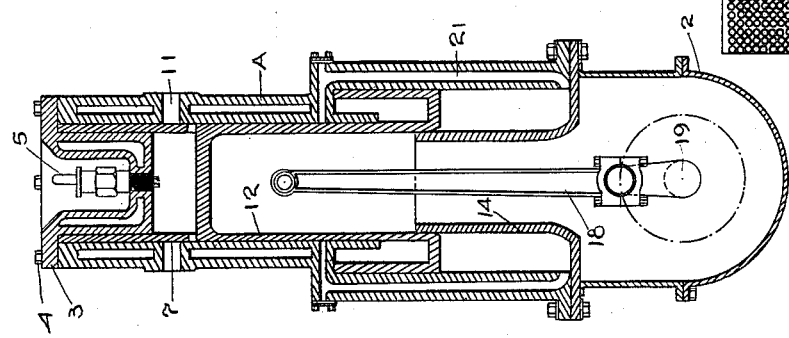
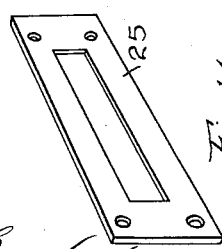
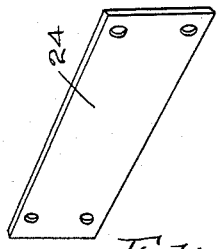

FELIX JOSWICH, OF ST. PAUL, MINNESOTA.

INTERNAL-COMBUSTION ENGINE.

1,139,770.  Specification of Letters Patent.  Patented May 18, 1915.

Application filed February 10, 1912. Serial No. 676,917.

*To all whom it may concern:*

Be it known that I, FELIX JOSWICH, a citizen of the United States, residing at St. Paul, in the county of Ramsey and State of Minnesota, have invented certain new and useful Improvements in Internal-Combustion Engines, of which the following is a specification.

My invention relates to improvements in internal combustion engines of the two-cycle type, its object being, among other things, to provide an engine in which the exhaust gases are thoroughly scavenged; to simplify the valve mechanism; and to increase the efficiency and simplify the working mechanism of the engine.

To this end the invention consists in the features of construction, combination, and arrangement of parts hereinafter described.

Figure 1:
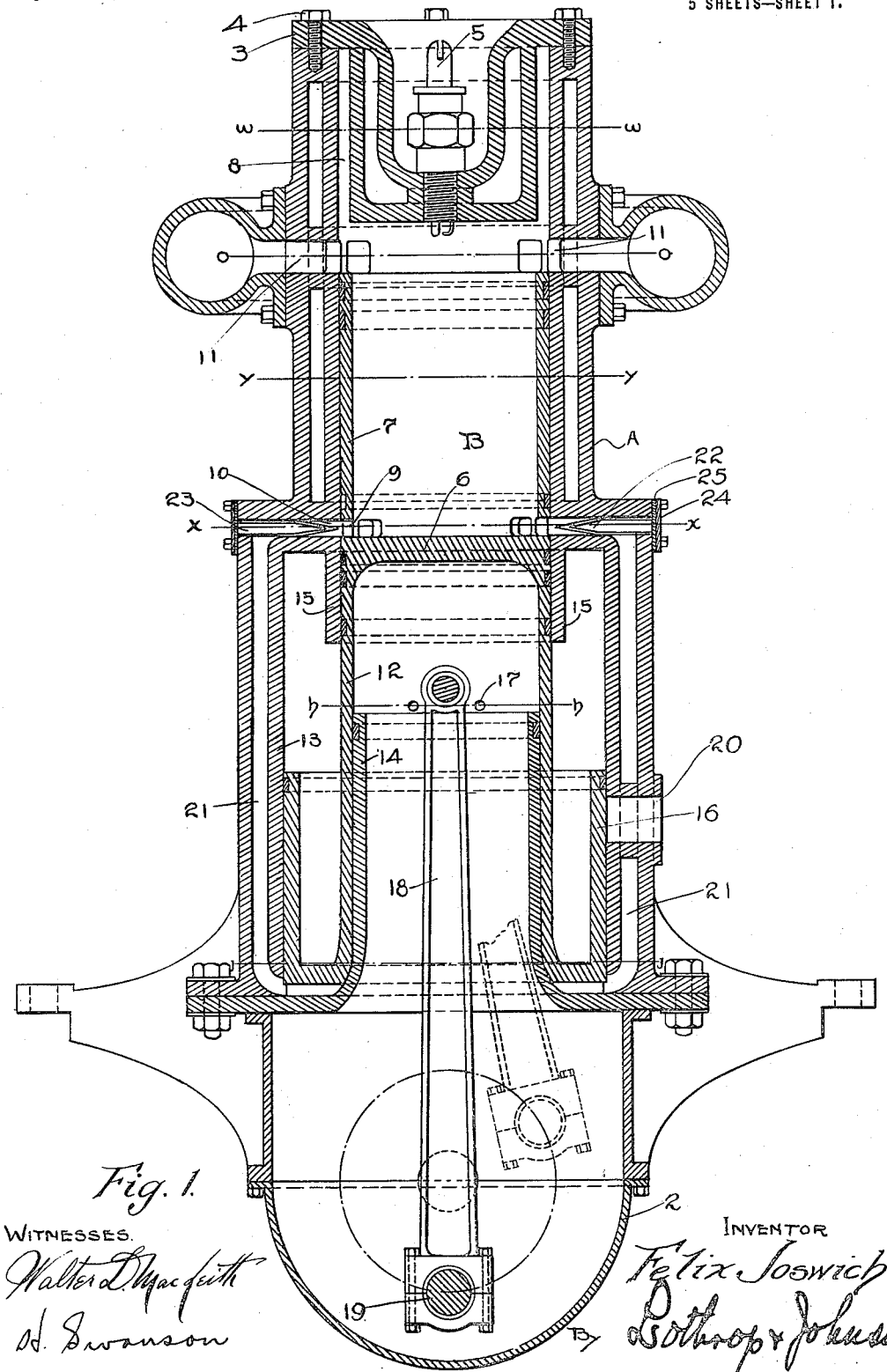
Figure 2:
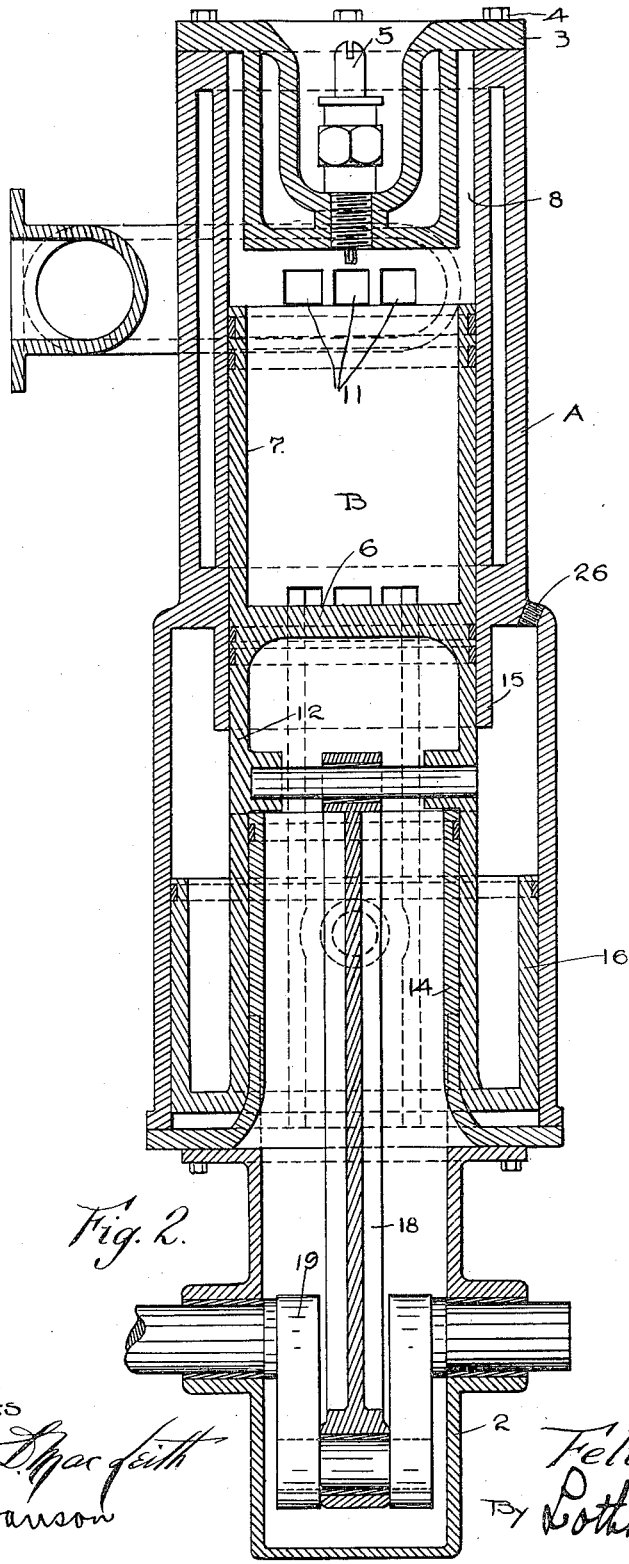
Figure 3:
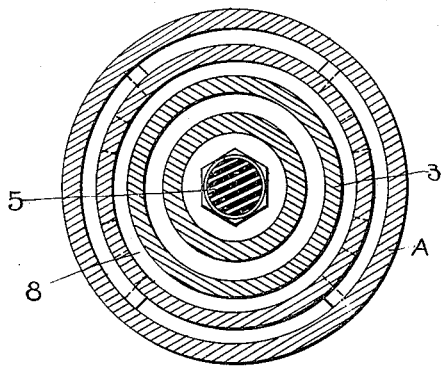
Figure 4:
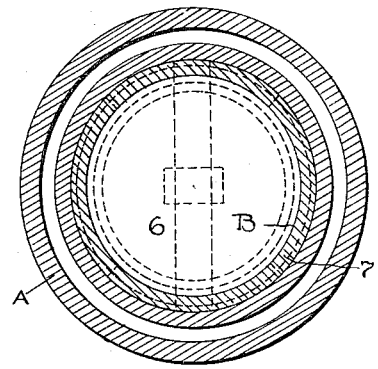
Figure 5:
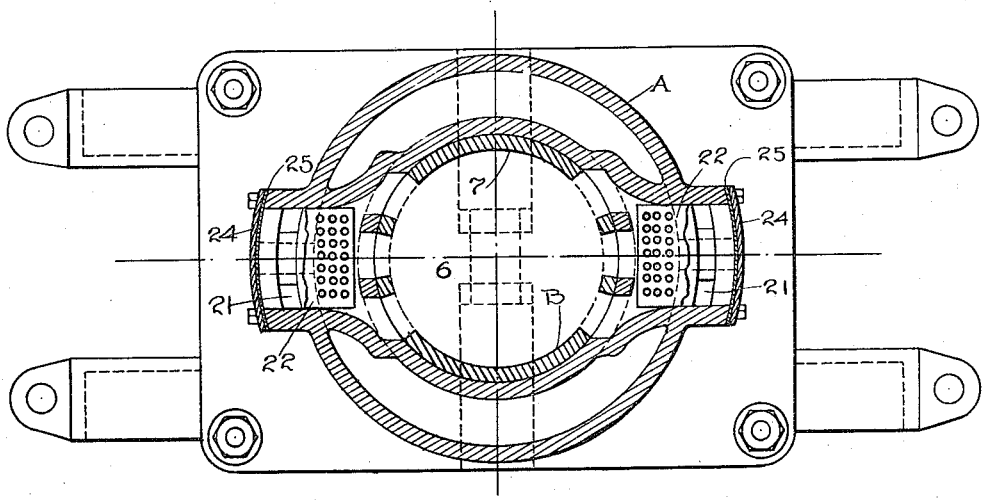

In the accompanying drawings forming part of this specification, Figure 1 is a vertical longitudinal section of the engine taken through the inlet and exhaust ports; Fig. 2 is a similar section taken at right angles to Fig. 1; Fig. 3 is a section on line $w$—$w$ of Fig. 1; Fig. 4 is a section on line $y$—$y$ of Fig. 1; Fig. 5 is a section on line $x$—$x$ of Fig. 1; Fig. 6 is a section on line $h$—$h$ of Fig. 1; Fig. 7 is a section on line $o$—$o$ of Fig. 1; Fig. 8 is a section on line $j$—$j$ of Fig. 1; Fig. 9 is a fragmental view of one side of the cylinder showing the inlet port from the carbureter; Fig. 10 is a partial elevation in section of a modified form of piston; Figs. 11, 12, and 13 are views corresponding to Fig. 1 showing the different positions of the piston; Fig. 14 is a packing plate; Fig. 15 is a coöperating percussion plate arranged in connection with the inlet port to blow out in case of premature explosion of gases; and Figs. 16 and 17 are side and end views, respectively, of fire screen trap arranged in connection with the inlet port.

Referring to the drawings, A represents a cylinder, 2 the crank case, and 3 the cylinder head secured upon one end of the cylinder, as by means of the bolts 4, and carrying a spark plug 5 of usual design. Slidable within the cylinder is the piston B. As shown in Fig. 1, the piston consists of a head 6 formed with an upwardly extending sleeve 7 adapted in the operation of the engine to slide into the grooves 8 between the cylinder and head. The sleeve 7, adjacent to the piston head, is formed upon opposite sides with inlet ports 9 adapted in the operation of the engine to coöperate with the inlet ports 10 hereinafter more particularly described, and with the exhaust ports 11 discharging through the opposite sides of the cylinder adjacent to the head, as hereinafter more particularly pointed out. Extending downwardly from the piston 6 is a sleeve 12, which at its lower end is widened to fit closely between the outer wall 13 and inner wall 14 of the cylinder. The outer wall 13 of the cylinder, together with the spaced inner walls 14 and 15, constitute an intermediate compression chamber within which the compression end 16 of the piston works. The wall 14, as shown in Fig. 1, stands slightly inside the wall 15 to allow the sleeve 12 to slide outside the wall 14 and inside the wall 15. As will thus be evident, I secure a compression chamber through the medium of the outer wall 13 of the cylinder and the inner walls 14 and 15, together with the coöperating piston sleeve 12. The piston is suitably connected by the link 18 with an ordinary crank shaft 19. Leading from a suitable carbureter, not shown, through the cylinder to the compression chamber just described is an inlet port 20. In order to provide for the passage of the explosive mixture from said compression chamber to the explosive chamber of the engine I provide the ports 21 upon opposite sides of the cylinder leading from the lower end of the compression chamber upwardly to the inlet ports 10, opening into explosion chamber above the piston head.

To provide against explosion in the ports 21, due to flame jumping back from the explosion chamber, I preferably arrange suitable fire screens 22 in the discharge ends of the ports 21. As a further protection in case of explosion taking place in said ports 21, I provide an opening 23 leading from the upper end of each port 21 through the outer wall of the cylinder and close said opening by a cap 24, a packing 25 being shown between the cap and wall of the cylinder. Thus, in the case of any accidental explosion in the ports 21, the cap will blow out saving the engine from injury.

The piston shown in Fig. 10 is similar to the piston shown in Fig. 1, except that at its initial compression end it is hollowed out on its underside instead of at its upper side, and formed with a groove 25 to receive the wall 15 in the operation of the engine.

I claim as my invention:

An engine of the class described, comprising a cylinder provided with an explosion chamber in one of its ends and a compression chamber in its opposite end, said explosion chamber having opposed exhaust ports at one of its ends and opposed inlet ports at its other end, a piston slidably mounted within said explosion chamber, an upwardly extending sleeve carried by said piston and coöperating with the inlet ports and the exhaust ports of the explosion chamber, and a plunger carried by said piston at the side thereof opposite to said sleeve, said plunger being slidably mounted within the compression chamber of the cylinder, the cylinder being provided with communicating passages arranged between the lower end of the compression chamber and the inlet ports of the cylinder for conveying the gases from the compression chamber to said inlet ports, said compression chamber being formed with an inlet port above its lower end, and said plunger being formed with a return wall overlapping said port when the piston is in lowered position.

FELIX JOSWICH.

Witnesses:
H. S. JOHNSON,
L. H. SWANSON.